United States Patent [19]

Kimura et al.

[11] Patent Number: 4,939,013
[45] Date of Patent: Jul. 3, 1990

[54] OPTICAL INFORMATION STORING MEDIUM

[75] Inventors: Kunio Kimura; Noboru Yamada, both of Hirakata; Susumu Sanai; Eiji Ohno, both of Osaka, all of Japan

[73] Assignee: Matsushita Electric Industrial Co., Ltd., Kadoma, Japan

[21] Appl. No.: 320,789

[22] Filed: Mar. 9, 1989

Related U.S. Application Data

[63] Continuation of Ser. No. 890,325, Jul. 29, 1986, abandoned.

[51] Int. Cl.$^5$ ............................................. B32B 3/02
[52] U.S. Cl. .................................. 428/64; 428/65; 428/688; 428/913; 430/940; 430/945; 346/76 L; 346/135.1; 369/284; 369/288
[58] Field of Search .................. 428/69, 65, 688, 913; 430/940, 945; 346/76 L, 135.1; 369/284, 288

[56] References Cited

U.S. PATENT DOCUMENTS

| | | | |
|---|---|---|---|
| 3,971,874 | 7/1976 | Ohta . | |
| 4,388,400 | 6/1983 | Takei et al. | 430/495 |
| 4,414,273 | 11/1983 | Wada et al. | 428/336 |
| 4,477,819 | 10/1984 | Lee et al. | 346/135.1 |
| 4,587,209 | 5/1986 | Ohno et al. | 430/945 |
| 4,621,032 | 11/1986 | deNeufville et al. | 428/688 |
| 4,656,079 | 4/1987 | Yamada et al. | 428/209 |

FOREIGN PATENT DOCUMENTS

| | | | |
|---|---|---|---|
| 58-54338 | 3/1983 | Japan . | |
| 0180885 | 9/1985 | Japan | 346/135.1 |

OTHER PUBLICATIONS

Chen et al., "Reversibility and Stability of Tellurium Alloys for Optical Storage Applications", Applied Physics Letters, vol. 46, No. 8, (Apr. 15, 1985).
SPIE vol. 695 Optical Mass Data Storage II (1986) pp. 79–85.

*Primary Examiner*—Patrick Ryan
*Attorney, Agent, or Firm*—Cushman, Darby & Cushman

[57] ABSTRACT

Optical information active layer mainly composed of a quaternary system of Te-Ge-Sn-Au, with composition ratios of Te, Ge and Sn that lie within an area represented by points A B C D and E on FIG. 1, with an additional amount of Au that is 1-40 atomic % of the quaternary system of Te-Ge-Sn-Au. The optical information active layer can be melted readily by a laser diode thereby achieving a high recording sensitivity, because it contains $Te_2 Au$ alloy having low melting point, CHR and erasability after repeated use and long term storage are small, and since excessive Te in the information active layer is stabilized by formings of Ge Te Su Te and Au Te.

3 Claims, 3 Drawing Sheets

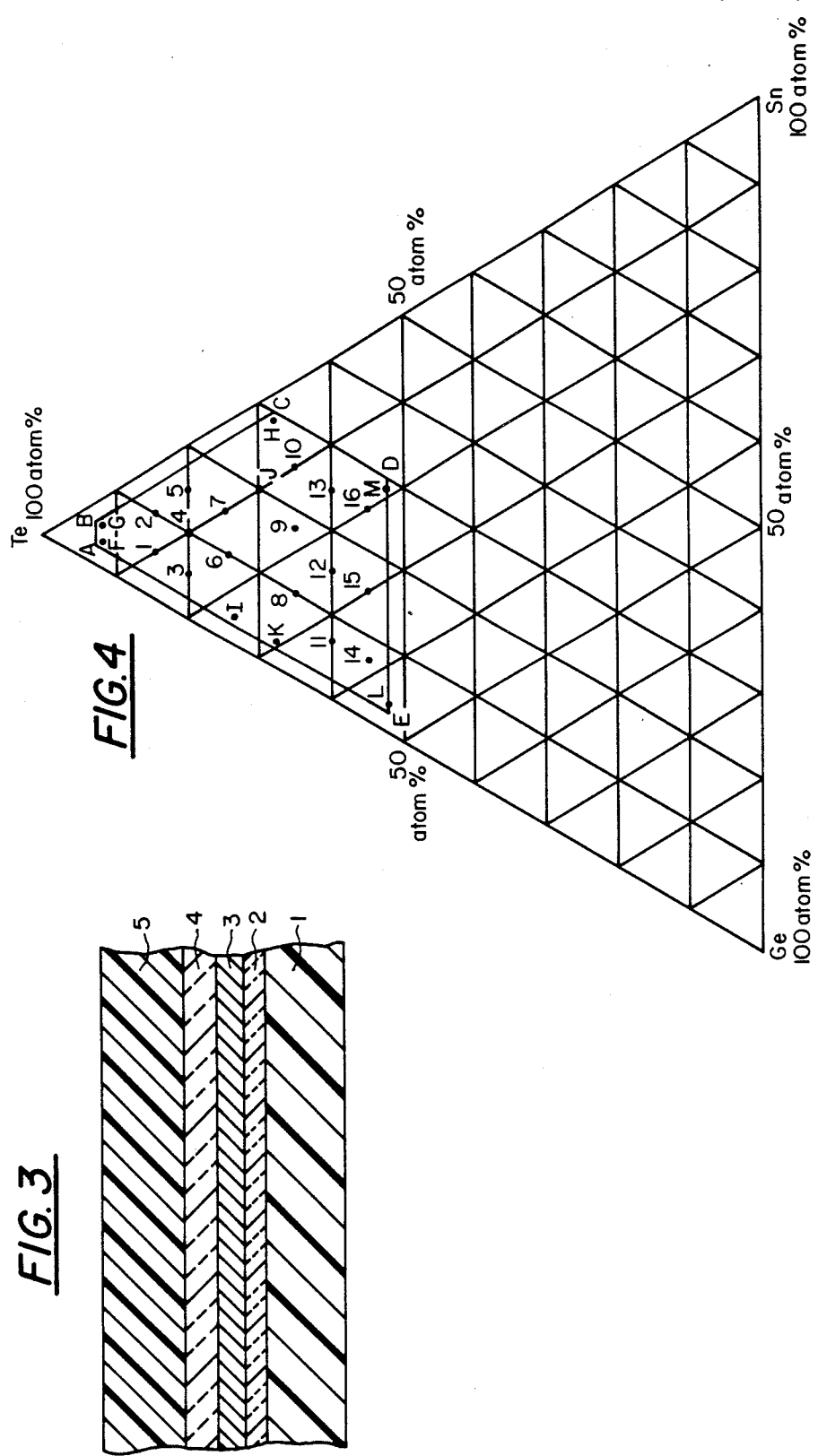

OPTICAL INFORMATION STORING MEDIUM

This is a continuation of application Ser. No. 06/890,325, filed July 29, 1986, which was abandoned upon the filing hereof.

FIELD OF THE INVENTION AND RELATED ART STATEMENT

1. Field of the Invention

The present invention relates generally to an information storing medium, and particularly to an optical information storing medium wherein recording, reproducing and erasing of information can be made in high density by using optical energy, heat energy or the like.

2. Description of the Related Art

Recently, accompanying an increase in information, there has been a demand for recording and reproducing information in high speed and high density, and, attention has been directed to the use of an optical disk using a laser beam to accomplish this goal. Optical disks are of several types including write-once and recording erasing types (hereinafter referred to as merely rewritable type). In the write once type, the recorded signal is reproduced by making pits or producing an unevenness to an active layer. In the rewriteable type of optical disk, the use of chalcogenides has been attempted, and various optical disks made of Te-Ge system or other chalcogenides wherein As, S, Si, Se, Sb, Bi or the like is added to Te-Ge are known.

On the other hand, the inventors of the present invention have provided a method wherein the change of reflectance based on a phase change of an information storing medium (active layer) containing oxide such as Te-TeO$_2$ system is turned into a signal.

Furthermore, the rewritable type optical disk wherein various additives such as Sn, Ge, Bi, In, Pb, Tl, Se and the like are added to the Te-TeO$_2$ system has been used for information storing medium.

The above-mentioned information storing media are moisture proof and exhibit an excellent carrier-to-noise ratio (hereinafter referred to as CNR).

However, the rewritable type information storing media made of the chalcogenides generally lack stability against the cycle of recording and erasing, because phase separation of additives such as Te and Ge or the like takes place several-time during the cycles, and as a result, the composition of used layer becomes different from that of unused layer.

In a rewritable type optical disk which utilizes the phase change between amorphous and crystalline states, the erasing crystallizes the active layer while the recording amorphizes it. In the above-mentioned case, the recording is performed by once melting the information active layer with a laser beam, and thereafter, rapidly cooling it to reduce it to the amorphous state. However, conventional laser diodes have their limitations. The lower the melting point of the information active layer, the higher the recording sensitivity thereof becomes. Therefore, in order to improve the recording sensitivity, the above-mentioned information active layer made of chalcogenides is provided with a composition which shows a lower melting point. That is, the composition of the information active layer is rich in Te. The fact that the amount of Te is larger than other additives means that the phase separation is liable to take place during the cycle of recording and erasing. Accordingly, the cyclability, the CNR and change of erasability with passage of time are dependant on how to fix the excess Te added to the information storing medium so as to lower the melting point thereof and how to keep the composition thereof constant.

Furthermore, there is another problem in the information storing medium containing oxides in that deterioration of the erasability is caused by the cycle of recording and erasing.

The rewritable type optical disk is initially in the crystalline state, while in the amorphous state, at the recorded state. And further, at the erased state, it is in the crystalline state. In this type of information storing medium, the phase change between the crystalline state and the amorphous state is attained by changing the cooling rate of the information storing medium after irradiation of laser beam. That is, after a heating by a laser beam, the information storing medium is turned into the crystalline state by slow cooling or turned into the amorphous state by rapid cooling. Therefore, the information storing medium is alternately turned into the crystalline state and the amorphous state as a result of the repetition between recording and erasing. In the above mentioned case, when oxides exist in the information storing medium, the information storing medium is liable to cause separation of the component itself, since the viscosity of the information storing medium is high, and migration migrate of the chalcogenides is rather restrained. Furthermore, the presence of the oxides lowers thermal conductivity of the information storing medium, and causes an uniform of temperature distribution between the laser beam incident side of the information storing medium the opposite side thereof. As a result, separation of the component of the information storing medium takes place. As mentioned above, the information storing medium containing the oxides has a problem of CNR change caused gradually by the cycle of recording and erasing.

OBJECT AND SUMMARY OF THE INVENTION

The present invention is intended to improve cyclability of an information storing medium (active layer) containing oxides, and to solve the above-mentioned problems pointed out with respect to the prior art.

An optical information storing medium of the present invention comprises a composition of a quaternary system of Te, Ge, Sn and Au, wherein atomic ratios of a ternary system consisting of the Te, the Ge and the Sn lie within an area in ternary system defined by contents A (Te$_{93}$, Ge$_5$, Sn$_2$), B (Te$_{93}$, Ge$_2$, Sn$_5$), C (Te$_{68}$, Ge$_2$, Sn$_{30}$), D (Te$_{52}$, Ge$_{18}$, Sn$_{30}$) and E (Te$_{52}$, Ge$_{46}$, Sn$_2$) and further containing Au at a concentration of 1–40 atom % thereof.

As mentioned above, the optical information storing layer of the present invention is a composition consisting essentially of a Te-Ge-Sn-Au system, and a feature of the present invention is in that excessive Te is fixed by adding Au to the Te-Ge-Sn system, whereby Au forms a compound with Te. In Au-Te system wherein Te concentration is higher than 50%, even at highest, the melting point of AuTe$_2$ is only 464° C. This melting point of 464° C. is lower by 300° C. above in comparison with that of Te-Ge system, Te-Sn system or the like. Accordingly, addition of Au fixes the excessive Te in the information storing layer containing Te as main component without raising the melting point thereof.

BRIEF DESCRIPTION OF THE DRAWINGS

FIG. 3 is a sectional view showing an embodiment of the present invention.

FIG. 4 is a ternary diagram showing atomic ratios of the ternary system Te-Ge-Sn of each sample used in Examples 1 and 2.

DESCRIPTION OF THE PREFERRED EMBODIMENTS

Figure 1:
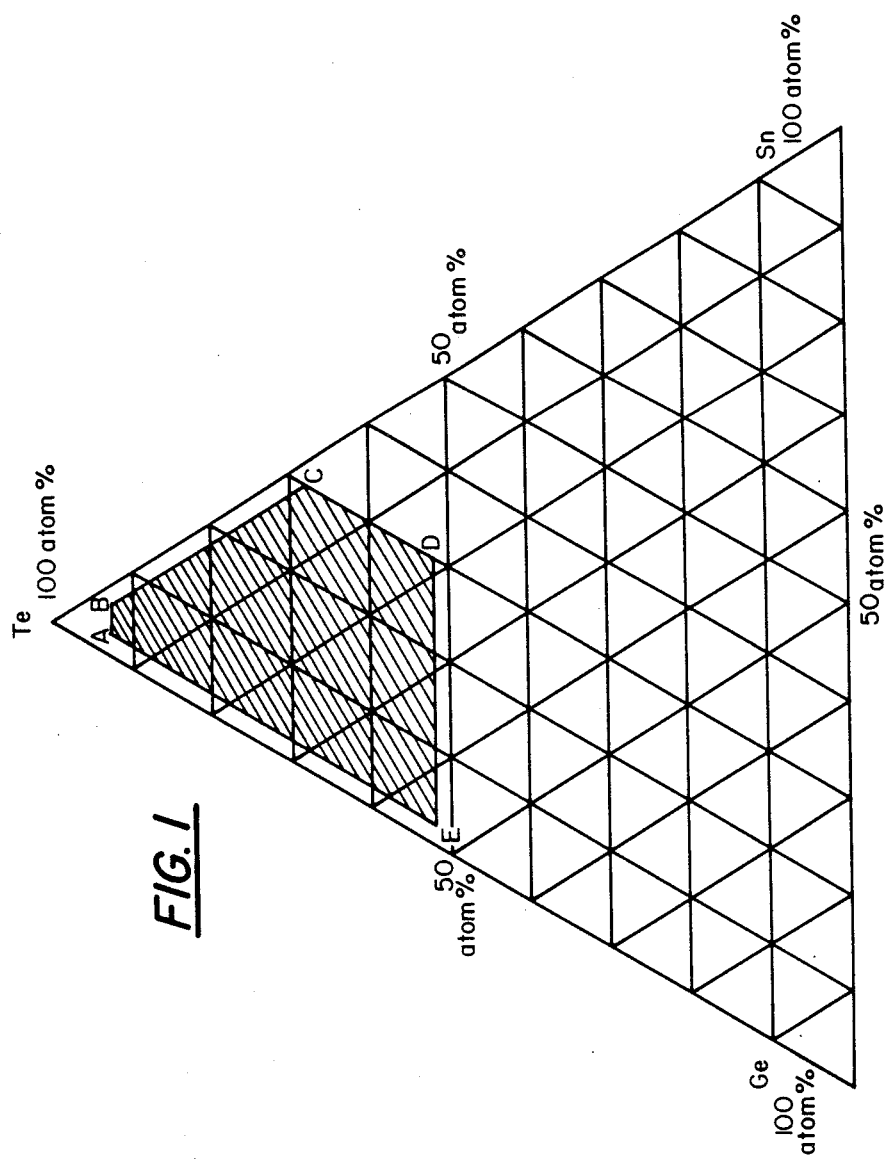
FIG. 1 is a ternary diagram showing atomic ratio of an ternary system Te-Ge-Sn of optical information storing medium of the present invention.

An optical information storing medium (active layer) of the present invention comprises Te-Ge-Sn-Au system as a principal material. In this information storing medium, Te is a base material which shows an optical concentration change before or after recording in a state wherein Te is combined with other elements. The phase change velocity between crystalline state and amorphous state is ruled by concentration ratio of Ge and Te. That is, in a lower concentration range of Ge (when the information storing medium consists of Te and Ge, concentration of Ge is less than 50 atom %), the information storing medium can be stable in the amorphous state, but when the concentration of Ge becomes high, the information storing medium is stable in the crystalline state. Therefore, it is difficult to amorphize the information storing medium in the crystalline state.

The Ge concentration of the present invention is below 50 atom %, accordingly the information storing medium of the present invention can be easily amorphized. Sn has the same function as Ge, but the range wherein the phase change velocity from a crystalline state an amorphous state occurs is narrow. And in such range of Sn in the present invention, Sn promotes the phase change velocity toward the crystalline state. That the, function of Ge and Sn to Te is analogous, but according to the concentration ratio thereof to Te, the tendency towards amorphization and crystallization are changed. When the concentrations of Ge and Sn are high, the information active layer is in a stable crystalline state, and therefore, the phase change from the amorphous state to the crystalline state takes place readily but it is difficult to crystallize the information active layer. Such a material is therefore used as writeonce material, however, it can also be used for the rewritable type disk, when a laser beam energy is enough strong to sufficiently melt an information active layer made of such a material. Currently, in an available laser diode, the laser power is about 30 mW at about 830 nm of wavelength. However, it is difficult for such a laser diode to melt a ternary system of Te-Ge-Sn having a composition near stoichiometry (GeTe or SnTe, having a melting point of about 800° C.). In the Te-Ge-Sn system, the recording and the erasing is possible in a range wherein Te concentration is very high (above 80 atom %). But in this range, the following problems are encountered Te-Ge-Sn system is not stable against heat, since the phase change temperature is lower, and furthermore, Te-Ge-Sn system is liable to phase separation to Te and GeTe, or Te and SnTe, since the concentration Te is excessive.

In the present invention, Au stabilizes the excessive Te by forming $AuTe_2$ occupies over 50 atom %, the melting point of the Au-Te alloy is below 464° C. And even when Au is added thereto, the melting point thereof does not increase, since the melting point of Te is low (451° C.). Therefore, an information active layer containing Au can be melted satisfactorily by the power a conventional laser diode. Further, it is stable against heat, and the phase change does not take place by repetition of the recording and the cycles. Therefore, it is stable for long period of time, since the excessive Te which is not stable with respect to heat is combined with Au as $Te_2Au$.

The necessary addition of Au is governed by the ratio of Te and (Ge+Sn), namely, when the Te concentration is high, the addition of Au is increased.

FIG. 1 shows a suitable atomic ratio for a ternary system Te-Ge-Sn of the information storing medium comprising a quaternary system Te-Ge-Sn-Au. Au occupies 1-40 atom % of the quaternary system Te-Ge-Sn-Au. Namely, the composition of the information storing medium is indicated by an expression of $(Te_x Ge_y Sn_z)_m Au_n$. In the expression, symbols x, y and z respectively represent atomic ratios (atom %) of Te, Ge and Sn to the ternary system of Te-Ge-Sn. Symbol m represents the atomic ratio (atom %) of the ternary system of Te-Ge-Sn to the quaternary system of Te-Ge-Sn-Au, and symbol n represents the atomic ratio (atom %) of Au to the quaternary system of Te-Ge-Sn-Au.

In FIG. 1, points A, B, C, D or E designate following compositions, respectively

| | | | | |
|---|---|---|---|---|
| A | $Te_{93}$ | $Ge_5$ | $Sn_2$ | (at %) |
| B | $Te_{93}$ | $Ge_2$ | $Sn_5$ | " |
| C | $Te_{68}$ | $Ge_2$ | $Sn_{30}$ | " |
| D | $Te_{52}$ | $Ge_{18}$ | $Sn_{30}$ | " |
| E | $Te_{52}$ | $Ge_{46}$ | $Sn_2$ | " |

The information storing medium of the present invention, concerning Te, Ge and Sn, has a composition range encircled by lines A-B, B-C, C-D, D-E and E-A. And Au is in a range of 1-40 at % of total composition of quaternary system of Te, Ge, Sn, Au.

When the Te concentration is higher than the line AB, the Ge concentration decreases, and therefore amorphization becomes difficult. Furthermore, since Ge Sn is of a lower concentration, the phase change temperature from the amorphous state to the crystalline state also becomes lower.

When the Ge concentration is lower than the line BC, in the same way as the case where Te is more than the line AB, the phase change temperature becomes low. On the other hand, amorphization is easier than the case where Te is higher than the line A-B. But the phase change velocity from the crystalline state to the amorphous state is insufficient for practical use as an information storing medium.

When the Sn concentration is higher than the line CD, the amorphization is difficult, since the addition of Sn promotes crystallization. Furthermore, the phase change temperature from the amorphous state to the crystalline state is lower, and lacks in heat stability.

When the Te concentration is lower than the line DE, the amorphization is difficult, since Te, Ge and Sn form GeTe and SnTe which are near stoichiometry and are stable in the crystalline state. Furthermore, in this composition range, excessive Te hardly exists, and therefore the addition of, Au can be decreased. In other words the, addition of Au has little effect in the above-mentioned composition range. As a result, the melting point of the information storing medium becomes high, and the amorphization is difficult.

When the Sn concentration is lower than the line EA, and information storing medium is stable in amorphous state, the crystallization becomes difficult. Crystallization is affected by ratio of Te and Ge on the line EA; and when the Te concentration is about 70 atom % the crystallization is most difficult, but, when the Te concentration is more than about 70 at %, the higher the Te concentration is, the easier the crystallization becomes. Furthermore, when the Te concentration is about 50 at %, the crystallization also becomes easy. When the Te concentration is around about 70 atom % the crystallization is generally difficult, because Te and Ge form $GeTe_2$ which is more stable in the amorphous state.

As mentioned above the, component ratio of ternary system of Te, Ge and Sn in the information storing medium of the present invention is represented by the area encircled by lines AB, BC, CD, DE and EA. Au is added thereto in a range of 1-40 atom % of total composition (Te-Ge-Sn-Au system). Thus, the recording and the erasing of information are accomplished by making use of reversibility of the crystalline state and the amorphous state.

Figure 2:
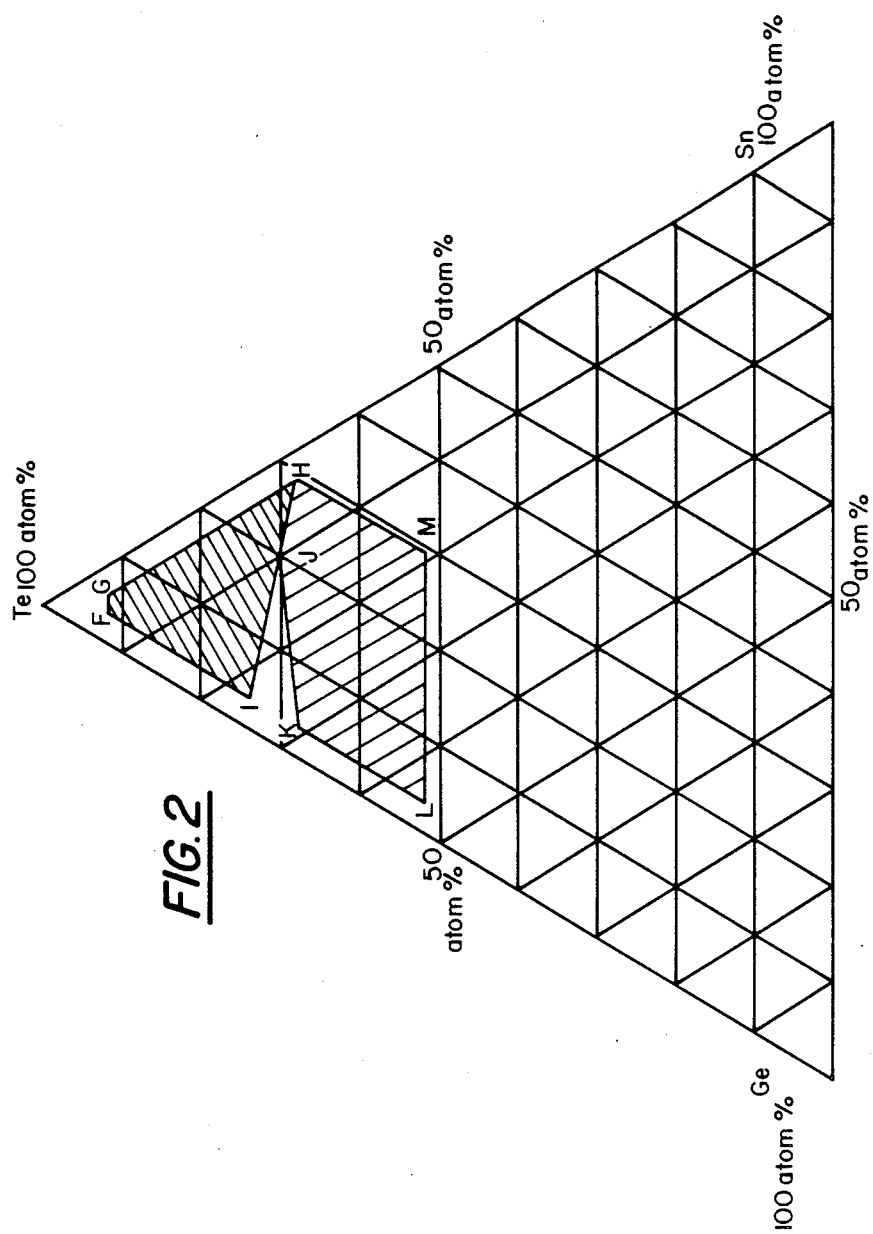
FIG. 2 is a ternary diagram showing an atomic ratio wherein the atomic ratio of FIG. 1 is limited.

Another embodiment is described in reference to FIG. 2. In the same way as FIG. 1, FIG. 2 shows a composition range of a ternary system of Te-Ge-Sn in the information storing medium made of quaternary system Te-Ge-Sn-Au. The range shown in FIG. 2 is of a more practical range than that of FIG. 1.

In FIG. 2, compositions of points F, G, H, I, J, K and M are as follows, respectively

| F | $Te_{92}$ | $Ge_5$ | $Sn_3$ |
| G | $Te_{92}$ | $Ge_3$ | $Sn_5$ |
| H | $Te_{68}$ | $Ge_3$ | $Sn_{29}$ |
| I | $Te_{74}$ | $Ge_{23}$ | $Sn_3$ |
| J | $Te_{70}$ | $Ge_{10}$ | $Sn_{20}$ |
| K | $Te_{68}$ | $Ge_{29}$ | $Sn_3$ |
| L | $Te_{52}$ | $Ge_{45}$ | $Sn_3$ |
| M | $Te_{52}$ | $Ge_{19}$ | $Sn_{29}$ |

In a range encircled by lines FG, GH, HI and IF, the Au concentration is 1-35 atom % of the quaternary system of Te-Ge-Sn-Au. And, in a range encircled by lines HJ, JK, KL, LM and MH, the Au concentration is 1-15 atom % of the quaternary system of Te-Ge-Sn-Au.

In the area encircled by the lines FG, GM, MI and IF, the phase change temperature is 90°-160° C., and is lower than that in the area encircled by the lines HJ, JK, KL, LM and MH. Addition of Au raises the phase change temperature to the crystalline state by 10°-30° C. in comparison with a system made of Te-Ge-Sn alone. Furthermore, the addition of Au lowers the melting point of the information active layer, and therefore the addition of Au is also effective for the amorphization. Although the melting point of Au alone is 1063° C. and is rather high, when Au concentration is below 47 atom % of Te, the melting point thereof decreases to below 464° C. On the other hand, when Ge or Sn concentration is below 50 atom % of Te, the melting points thereof are respectively below 725° C. and 790° C. Therefore, the addition of Au is effective for raising the phase change temperature representing heat stability, and also for lowering the melting point of the information active layer thereby enabling the amorphization.

In the information storing medium having a composition defined by the area encircled by the lines HJ, JK, KL, LM and MH, the phase change temperature is about 150°-220° C. the area encircled by the lines HJ, JK, KL, LM and MH. In the information storing medium having a composition of this area, the the phase change temperature is about 150°-220° C. As mentioned above, excessive Te is contained in a small amount; and therefore, the effect of the addition of Au can not be compared with the area encircled by the lines FG, GH, HI and IF. However, the amorphization is easier than in the case of the Te-Ge-Sn system. An information storing medium having a composition designated by the above-mentioned area has a high phase change temperature, and therefore, is stable with respect to heat. The crystallization thereof is easy, and the amorphization is difficult, since GeTe and SnTe contained in the information storing medium have compositions of near stoichiometry, and they are stable with respect to heat. But, when the high power laser diode is used, amorphization can be accomplished easily.

In the area encircled by lines IJ, JK, KI, the crystallization is difficult, since $GeTe_2$ exists in a stable amorphous state.

As mentioned above, the information storing medium of the present invention has preferable range for the composition thereof, and the most suitable range is restricted.

Next, a method for manufacturing the optical information storing medium of the present invention is described with reference to FIG. 3.

FIG. 3 is a schematic sectional view showing the optical disk having the information storing medium of the present invention. As shown in FIG. 3, the optical disk comprises substrates 1 and 5, an information active layer 3 and protective layers 2 and 4. The substrates 1 and 5 can be made of transparent substance such as polycarbonate resin, acrylic resin, glass, polyester resin or the like. The protective layers 2 and 4 can be made of various oxides, sulfides, carbonates or the like. The protective layers 2 and 4 prevent thermal deterioration of the substrates 1 and 5 based on cycle of the recording and the erasing of the information active layer 3, and furthermore, protects the information active layer against moisture. Therefore, a material of the protective layers 2 and 4 and thickness thereof are determined from the above-mentioned factors. The information active layer 3 is formed by various deposition methods, e.g., the sputtering evaporation method or the like. In case of various deposition methods, it is desirable to use an electron beam deposition device having a multi-source, whereby each of the components can be independently deposited, and a uniform layer can be formed.

The thickness of the information active layer 3 is determined with respect to for optimization of the optical condition of the protective layers 2 and 4. Namely, the information active layers 2 and 4 are given a thickness wherein the difference of reflectance between recorded part and non-recorded part is increased.

The following, examples are described.

EXAMPLE 1

Te, Ge, Sn and Au were independently deposited from a source by using a four source electron beam deposition device. The substrate used was a glass plate of 8 mm $\phi$ in diameter. The deposition was performed under the following conditions: vapor pressure $1 \times 10^{-5}$ Torr, revolution number of the substrate 150 rpm, and thickness of the information active layer 1000

Å. The deposition rate of each component (Te, Ge, Sn and Au) was changed to control the atomic ratio of Te, Ge, Sn and Au in the information active layer. The atomic ratios shown in Table 1 are values which are calculated from the vapor deposition rates, and the almost same values were obtained by quantitative analysis using an X-ray-microanalyzer (XMA) with respect to several typical samples. Therefore, it is assumed that the calculated values in Table 1 coincide with the experimental values. In the following examples the evaluation method for samples obtained by the above-mentioned manufacturing method are described.

Phase Change Temperature

The phase change temperature is defined as a temperature at which the deposited information active layer in the amorphous state changes into the crystalline state by heat. Measurement of the phase change temperature was made by using an apparatus which is capable of measuring transmittance and using a temperature, at which a decrease in transmittance starts when the temperature of sample is raised by heating in a rate of 1° C./sec as the phase change temperature.

The fact that the phase change temperature is high means that composition has high heat stability.

Characteristics of Crystallization and Amorphization

The characteristics of crystallization exhibits a phase change velocity from amorphous state to crystalline state, and the characteristics of amorphization exhibits a phase change velocity from the crystalline state to the amorphous state.

The characteristics of crystallization and amorphization were measured by the following method. A test sample was made by forming an information active layer on a glass plate having 0.5 mm thickness and 8 mm diameter. A laser beam was focused on the information active layer by using a lens, and crystallization and amorphization of the information active layer were alternately observed by moving the sample horizontal direction. The parameters for the laser beam were as follows: spot size 45×0.4 μm, pulse width 400 ns, power density was 10.6 mW/μm² and wavelength 900 nm. The characteristics of crystallization were judged by the observing phase change velocity (from the amorphous state to the crystalline state), when the samples were moved relatively slowly. In Table 1, a mark ⊙ represents a sample having a sufficiently high phase change velocity, and enough large contrast ratio between the recorded part and the non-recorded part. On the other hand, a mark X represents a sample which did not crystallize when the sample was driven slowly and hence shows insufficient contrast ratio. Marks O and Δ indicate the samples which showed a characteristic crystallization lying between the samples represented by the marks ⊙ and X. (The mark O is superior to the mark Δ.) In such a quantitative evaluation, the samples represented by the marks ⊙ and O have practicable characteristics of crystallization.

The characteristic of amorphization are now described. In order to observe the characteristics of amorphization, the sample the was crystallized, and thereafter, it was amorphized by driving the sample quickly thereby to cool it rapidly. The characteristics of the amorphization were judged by observing the phase change velocity (from the crystalline state to the amorphous state) and the contrast ratio between the crystalline state and the amorphous state. The mark ⊙' represents a sample which could be amorphized even when it was driven relatively slow, and which showed large contrast ratio between the amorphous state part and the crystalline state part. On the other hand, a mark X' represents the sample which could not be amorphized when it was driven slowly. Marks O' is and Δ' represent samples which showed characteristics of amorphization lying between the samples represented by marks ⊙' and X'. (The mark O' is superior to the mark Δ'.)

In the above-mentioned evaluation, when the sample exhibits excellent characteristics of crystallization and amorphization, it is represented by marks ⊙ and ⊙'. However, it is impossible to exhibit both characteristics, and to a great extent therefore, a material which is represented by the marks ⊙ and O', or ● and Δ' is suitable for the information storing medium. In other words, a material which exhibits to a certain extent the characteristics of crystallization is preferable for the information storing medium.

The phase change temperature and characteristics of the crystallization and amorphization of the information active layer in the present invention are shown in Table 1. Compositions; and of Te-Ge-Sn system in the information active layers are shown in the ternary diagram of FIG. 4 which is corresponding to FIG. 1.

TABLE 1

| Sample No. | Composition | Temperature of phase change | Characteristics of crystallization and amorphization | |
|---|---|---|---|---|
| | | | Crystallization | Amorphization |
| A | (Te93Ge5Sn2)70Au30 | 95 | . | X'-Δ' |
| B | (Te93Ge2Sn15)70Au30 | 90 | | X'-Δ' |
| C | (Te68Ge2Sn30)95Au5 | 110 | | Δ' |
| D | (Te52Ge18Sn30)97Au3 | 190 | Δ | Δ' |
| E | (Te52Ge46Sn2)97Au3 | 220 | | X'-Δ' |
| F | (Te92Ge5Sn3)70Au30 | 105 | | Δ' |
| G | (Te92Ge3Sn5)70Au30 | 100 | | Δ' |
| H | (Te68Ge3Sn29)95Au5 | 120 | | Δ' |
| I | (Te74Ge23Sn3)95Au5 | 180 | Δ | ' |
| J | (Te70Ge10Sn20)95Au5 | 160 | Δ | ' |
| K | (Te68Ge29Sn3)95Au5 | 185 | Δ | ' |
| L | (Te52Ge45Sn3)97Au3 | 210 | | ' |
| M | (Te52Ge19Sn29)97Au3 | 195 | O | Δ' |
| 1 | (Te85Ge10Sn5)72Au28 | 125 | | ' |
| 2 | (Te85Ge5Sn10)72Au28 | 115 | | ' |
| 3 | (Te80Ge15Sn5)75Au25 | 140 | | ' |
| 4 | (Te80Ge10Sn10)75Au25 | 130 | ⊙ | ' |
| 5 | (Te80Ge5Sn15)75Au25 | 125 | O | ' |
| 6 | (Te75Ge15Sn10)80Au20 | 160 | O | ' |
| 7 | (Te75Ge10Sn15)80Au20 | 150 | O | Δ' |
| 8 | (Te65Ge25Sn10)90Au10 | 170 | Δ | Δ' |
| 9 | (Te65Ge17Sn18)90Au10 | 160 | O | Δ' |
| 10 | (Te65Ge10Sn25)90Au10 | 155 | O | Δ' |
| 11 | (Te60Ge33Sn7)95Au5 | 190 | O | X'-Δ' |
| 12 | (Te60Ge25Sn15)95Au5 | 180 | O | Δ' |
| 13 | (Te60Ge15Sn25)95Au5 | 165 | O | Δ' |
| 14 | (Te55Ge38Sn7)98Au2 | 200 | O | X'-Δ' |
| 15 | (Te55Ge30Sn15)98Au2 | 195 | O | Δ' |
| 16 | (Te55Ge20Sn25)98Au2 | 190 | O | Δ' |

As clearly shown in Table 1, in the Te-Ge-Sn-Au system having compositions of the present invention, at least one of characteristics of crystallization and amorphization does not belong to X or X'. Therefore, all information storing mediums of the present invention can be amorphized and crystallized according to heating condition, thereby enabling the writing of and erasing of information.

EXAMPLE 2

In a similar manner, as the manufacturing method and evaluation method of the Example 1, the effect of the addition of Au were observed. The results are shown in Table 2.

From the area encircled by lines FG, GH, HI and IF of FIG. 2, a composition ($Te_{80}Ge_{10}Sn_{10}$) represented by point 4 of FIG. 4 was selected, and from the area encircled by lines HJ, JK, KL, LM and MH of FIG. 2, a composition ($Te_{60}Ge_{25}Sn_{15}$) represented by point 12 was selected. In Table 2, the Au concentration (atom %) was represented by n in the expression of $(Te_xGe_ySn_z)_mAu_n$.

TABLE 2

| Sample No. | Composition | Au concentration (atom %) | Temperature of phase change | Characteristics of crystallization and amorphization | |
|---|---|---|---|---|---|
| | | | | Crystallization | Amorphization |
| 17 | $(Te_{80}Ge_{10}Sn_{10})_mAu_n$ | 8 | 95 | △ | O' |
| 18 | | 10 | 100 | O | △' |
| 19 | | 15 | 110 | O | △' |
| 20 | | 20 | 120 | O-◉ | O' |
| 4 | | 25 | 130 | O-◉ | O' |
| 21 | | 30 | 135 | O | O' |
| 22 | | 35 | 140 | O | ◉ |
| 23 | | 37 | 150 | △ | ◉ |
| 24 | $(Te_{60}Ge_{25}Sn_{15})_mAu_n$ | 0.8 | 180 | O | X' |
| 25 | | 1 | 185 | O | X'-△' |
| 26 | | 2 | 190 | O | O' |
| 12 | | 5 | 195 | O | △' |
| 27 | | 8 | 200 | O | △' |
| 28 | | 10 | 205 | O | △' |
| 29 | | 15 | 220 | △ | △' |
| 30 | | 17 | 195 | X-△ | △' |

As clearly shown in Table 2, in a composition of point 4 of FIG. 4. The Au concentration was 25 atom % of quaternary system of Te-Ge-Sn-Au, and characteristics of the crystallization and amorphization of the composition were evaluated by marks O-◉ and O.' Furthermore, when the composition of the Te-Ge-Sn system was in the area encircled by the lines FG, GH, MI and IF, and Au concentration was in a range of 10-35 atom % of the quaternary system of Te-Ge-Sn-Au, the characteristics of the crystallization and the amorphization were exhibited, and they were evaluated by the marks O, △'-, O ◉'.

In the composition represented by point 12 of FIG. 4, Au concentration was 5 atom %. And the characteristics of the crystallization and amorphization of the composition were evaluated by the marks O and △'. Furthermore, when the composition of the Te-G-Sn system was in the area encircled by the lines HJ, JK, KL, LM and MH, and Au concentration was 1-15 atom %, usable characteristics of the crystallization and amorphization could be obtained. However, when Au concentration was less than 1 atom % such as point 24 in FIG. 4, amorphization did not take place, therefore such a composition was not suitable for rewritable type information active layer. On the other hand, when Au concentration was greater than 15 atom %, such as point 30 in FIG. 4, the characteristics of the crystallization were evaluated by the marks X or △, and therefore it was found that such a composition was not practicable. Accordingly, when the composition of the Te-Ge-Sn system is in the area encircled by the lines HJ, JK, KL, LM and MH, the preferable Au, concentration is 1-15 atom % of the ternary system of Te-Ge-Sn-Au.

EXAMPLE 3

Two kinds of optical disks were made for trial, wherein polycarbonate resin plates of 1.2 mm thickness and 200 mm in diameter were used as substrates for both disks, and thin layers having compositions represented by point 21 in FIG. 4 (($Te_{80}Ge_{10}Sn_{10})_{70}Au_{30}$) and point 26 in FIG. 4 (($Te_{60}Ge_{25}Sn_{15})_{98}Au_2$) were formed on respective substrates as information active layer.

The method for forming the information active layers is the same as the Example 1. Additionally, before the information active layer was formed, a ZnS layer having 900 Å thickness was formed on the substrate as a heat resistance layer by means of electron beam deposition, and furthermore, after forming the information active layer, the ZnS layer having 1800 Å thickness was formed on the information active layer. Recording was performed by converting the information active layer into the amorphous state, and the erasing was performed by converting it into the crystalline state. Conditions of the recording and the erasing were as follows: laser power for the recording and the erasing were respectively 8 mW and 15 mW, laser spot for the recording was focused in 1 $\mu m$ $\phi$ in half width, and laser beam profile for the erasing was shaped to have a cross-section of ellipse wherein half major axis was about 15 $\mu m$, and half minor axis was 1 $\mu m$. Recording frequency was 2 MHz and linear velocity is 5 m/s. CNR of the first disk wherein the information active layer had the composition represented by the point 21 (hereinafter referred to merely as No. 21 disk) was 55 dB, and erasability thereof was −53 dB. CNR of another (second) disk (No. 26 disk) was 50 dB, and the recording ratio thereof was −49 dB.

EXAMPLE 4

A life test was made with respect to the No. 21 disk in the following Example 3 under the conditions temperature of 80° C. and 60% RH. In the life test, the information was recorded in advance, and after storing them for a predetermined period of time under the above-mentioned conditions, degradation of the CNR and change of the erasability with passage of time were observed. As a result, after the information storing for one month, the CNR lowered by 0.5 dB, and the erasability lowered by 1 dB.

EXAMPLE 5

The cyclability of the recording and erasing were observed with respect to the No. 21 disk and No. 26 disk. After a hundred thousand cycles of the recording and the erasing, the CNR of the No. 21 disk lowered by 2 dB, and that of the No. 26 disk lowered by 1 dB. The erasability of the No. 21 disk lowered by 1 dB, and that of the No. 26 disk lowered by 0.5 dB.

EXAMPLE 6

Two kinds of optical disks were made for trial in the similar way as the No. 21 and No. 26 disks, wherein a first heat resistance layer was formed by using $GeO_2$ or SiC on a substrate, and furthermore, after forming an information active layer having a composition represented by the point 21 in Table 1, and furthermore a second heat resistance layer was formed on the information active layer, and the thickness of the heat resistance layer (laser beam incident side) was 800 Å, and that of another layer was 1900 Å. The CNR of the disk having the $GeO_2$ layers was 54 dB, and the erasability thereof was −54 dB. The CNR of the disk having the SiC layers was 52 dB, and the erasability thereof was −50 dB. Moreover, as a result of the life test as described in the Example 3, after one month, the CNR of the disk having the $GeO_2$ layers lowered by 3 dB, and that of disk having the SiC layers lowered by 0.8 dB.

EXAMPLE 7

A disk according to Example 1 was manufactured, wherein substrate was replaced by polycarbonate resin, and information active layer had a composition of No. 5 in Table 1. ZnS was used for heat resistance layers. Thicknesses of the first ZnS layer, the information active layer and the second ZnS layer were respectively 860 Å, 300 Å and 1950 Å thick. The CNR of this disk was 56 dB, and the erasability was 55 dB. As a result of cycle test as described in the Example 5, after a hundred thousand cycles, the CNR lowered by 2 dB.

As mentioned above in the information storing medium of the present invention, the range wherein the information storing medium can be crystallized and amorphized was extended by adding Au to the Te-Ge-Sn system, and the cycle characteristic thereof are excellent, and the erasability change with storing time is small. Moreover, although the information storing medium of the present invention shows excellent heat and humidity stability, it can be sufficiently crystallized (erased) and amorphized (recorded) by the laser beam energy of a conventional laser diode. Therefore, by the present invention, it becomes possible to provide an excellent optical information storing media.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An optical information storing medium consisting essentially of an oxygen free composition of a quaternary system of Te, Ge, Sn and Au,
    wherein atomic ratios of a ternary system consisting of said Te, said Ge and said Sn lie within an area in ternary system defined by contents A ($Te_{93}$, $Ge_5$, $Sn_2$), B ($Te_{93}$, $Ge_2$, $Sn_5$), C ($Te_{68}$, $Ge_2$, $Sn_{30}$), D ($Te_{52}$, $Ge_{18}$, $Sn_{30}$) and E ($Te_{52}$, $Ge_{46}$, $Sn_2$) and
    further said quaternary system containing Au at a concentration of 1-40 atom % thereof.

2. An optical information storing medium in accordance with claim 1 wherein:
    atomic ratios of said ternary system of Te, Ge and Sn lie within an area in ternary system defined by contents F ($Te_{92}$, $Ge_5$, $Sn_3$), G ($Te_{92}$, $Ge_3$, $Sn_5$), H ($Te_{68}$, $Ge_3$, $Sn_{29}$), I ($Te_{74}$, $Ge_{23}$, $Sn_3$) and
    further said quaternary system containing Au at a concentration of 10-35 atom % thereof.

3. An optical information storing medium in accordance with claim 1 wherein:
    atomic ratios of said ternary system of Te, Ge and Sn lie within an area in ternary system defined by contents H ($Te_{68}$, $Ge_3$, $Sn_{29}$), J ($Te_{70}$, $Ge_{10}$, $Sn_{20}$), L ($Te_{52}$, $Ge_{45}$, $Sn_3$) and M ($Te_{52}$, $Ge_{19}$, $Sn_{29}$) and
    further said quaternary system containing Au at a concentration of 1-15 atom % thereof.

* * * * *